(12) United States Patent
Sugimoto

(10) Patent No.: US 8,199,756 B2
(45) Date of Patent: Jun. 12, 2012

(54) FORWARDING APPARATUS, FORWARDING METHOD, AND COMPUTER PRODUCT

(75) Inventor: Yoshinari Sugimoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 136 days.

(21) Appl. No.: 12/031,002

(22) Filed: Feb. 14, 2008

(65) Prior Publication Data

US 2008/0232388 A1 Sep. 25, 2008

(30) Foreign Application Priority Data

Mar. 20, 2007 (JP) ................................. 2007-072196

(51) Int. Cl.
*H04L 12/28* (2006.01)

(52) U.S. Cl. ......................... 370/392; 370/428; 370/368

(58) Field of Classification Search .................. 370/426, 370/389, 392, 428

See application file for complete search history.

(56) References Cited

U.S. PATENT DOCUMENTS

| | | | | |
|---|---|---|---|---|
| 5,905,715 | A * | 5/1999 | Azarmi et al. | 370/244 |
| 7,002,977 | B1 * | 2/2006 | Jogalekar | 370/410 |
| 7,313,144 | B2 * | 12/2007 | Kobayashi et al. | 370/395.43 |
| 2002/0196794 | A1 * | 12/2002 | Bloch et al. | 370/401 |
| 2003/0197722 | A1 * | 10/2003 | Sugauchi et al. | 345/736 |
| 2005/0120292 | A1 * | 6/2005 | Suzuki | 715/501.1 |
| 2006/0072565 | A1 * | 4/2006 | Yazaki et al. | 370/389 |
| 2007/0260840 | A1 * | 11/2007 | Watanabe | 711/165 |

FOREIGN PATENT DOCUMENTS

| | | |
|---|---|---|
| JP | 04-358390 | 12/1992 |
| JP | 7-225709 | 8/1995 |
| JP | 10-4441 | 1/1998 |
| JP | 2006-108985 | 4/2006 |

OTHER PUBLICATIONS

"Decision of a Patent Grant" mailed by JPO and corresponding to Japanese application No. 2007-072199 on Apr. 19, 2011, with English translation.

* cited by examiner

*Primary Examiner* — Dang Ton
*Assistant Examiner* — Mandish Randhawa
(74) *Attorney, Agent, or Firm* — Fujitsu Patent Center

(57) ABSTRACT

An apparatus for forwarding a frame according to a transfer condition includes a transfer-condition storage unit, a deleted-area data storage unit, and a transfer-condition searching unit. The transfer-condition storage unit stores therein, destination data that is likely to be included in the frame, area data indicating an area of destination indicated by the destination data, and the transfer condition in such a way that the area data and the transfer condition are associated with the destination data. The deleted-area data storage unit stores therein as deleted area data, the area data assigned to data to be deleted from the transfer-condition storage unit. The transfer-condition searching unit removes, from a search target, an area to which the deleted area data stored in the deleted-area data storage unit is assigned, to search, from the transfer-condition storage unit, for the transfer condition corresponding to the destination data included in the frame.

4 Claims, 11 Drawing Sheets

FIG.3A

| FRAME TABLE | | | |
|---|---|---|---|
| FRAME IDENTIFICATION DATA | | | ADDRESS |
| AREA DATA | VLAN ID | MAC | |
| 0001 | 100 | A | addr#01 |
| 0001 | 101 | B | addr#02 |
| 0001 | 102 | C | addr#03 |
| 0001 | 103 | D | addr#04 |
| 0010 | 104 | A | addr#05 |
| 0010 | 105 | B | addr#06 |
| 0010 | 106 | C | addr#07 |
| 0010 | 107 | D | addr#08 |
| 0100 | 100 | D | addr#09 |
| 0100 | 101 | C | addr#10 |
| 0100 | 102 | B | addr#11 |
| 0100 | 103 | A | addr#12 |
| 1000 | 104 | D | addr#13 |
| 1000 | 105 | C | addr#14 |
| 1000 | 106 | A | addr#15 |
| 1000 | 107 | A | addr#16 |

FIG.3B

| TRANSFER CONDITION TABLE | | |
|---|---|---|
| ADDRESS | TRANSFER CONDITION | |
| | DESTINATION PORT | PROCESS CONTENT |
| addr#01 | port#1 | TRANSFER |
| addr#02 | port#2 | TRANSFER |
| addr#03 | port#5 | DISCARD |
| addr#04 | port#4 | TRANSFER |
| addr#05 | port#2 | DISCARD |
| addr#06 | port#7 | TRANSFER |
| addr#07 | port#3 | TRANSFER |
| addr#08 | port#6 | TRANSFER |
| addr#09 | port#1 | TRANSFER |
| addr#10 | port#2 | TRANSFER |
| addr#11 | port#5 | DISCARD |
| addr#12 | port#4 | TRANSFER |
| addr#13 | port#2 | DISCARD |
| addr#14 | port#7 | TRANSFER |
| addr#15 | port#3 | TRANSFER |
| addr#16 | port#6 | TRANSFER |

FIG.10A

| | FRAME TABLE | | | | |
|---|---|---|---|---|---|
| | FRAME IDENTIFICATION DATA | | | | ADDRESS |
| | AREA DATA | | VLAN ID | MAC | |
| | LARGE AREA | SMALL AREA | | | |
| AREA 0001 { | 01 | 0001 | 100 | A | addr#01 |
| | 01 | 0001 | 101 | B | addr#02 |
| | 01 | 0001 | 102 | C | addr#03 |
| | 01 | 0001 | 103 | D | addr#04 |
| AREA 0010 { | 01 | 0010 | 104 | A | addr#05 |
| | 01 | 0010 | 105 | B | addr#06 |
| | 01 | 0010 | 106 | C | addr#07 |
| | 01 | 0010 | 107 | D | addr#08 |
| AREA 0100 { | 10 | 0100 | 100 | D | addr#09 |
| | 10 | 0100 | 101 | C | addr#10 |
| | 10 | 0100 | 102 | B | addr#11 |
| | 10 | 0100 | 103 | A | addr#12 |
| AREA 1000 { | 10 | 1000 | 104 | D | addr#13 |
| | 10 | 1000 | 105 | C | addr#14 |
| | 10 | 1000 | 106 | A | addr#15 |
| | 10 | 1000 | 107 | A | addr#16 |

LARGE AREA 01 = AREA 0001 + AREA 0010
LARGE AREA 10 = AREA 0100 + AREA 1000

COMPARISON CONDITION: [01:xxxx:103:D]

| | FRAME IDENTIFICATION DATA | | | |
|---|---|---|---|---|
| | AREA DATA | | VLAN ID | MAC |
| WHEN REMOVING LARGE AREA 10 FROM SEARCH TARGET | LARGE AREA | SMALL AREA | | |
| SEARCH KEY | 01 | Don't care | 103 | D |
| MASK KEY | 11 | 0000 | all '1' | all '1' |

FIG.10B

WHEN REMOVING LARGE AREA 01 FROM SEARCH TARGET → [10   Don't care / 11   0000] → [10:xxxx]

WHEN REMOVING LARGE AREA 10 AND SMALL AREA 0001 FROM SEARCH TARGET → [01   0000 / 11   0001] → [01:xxx0]

REMOVING LARGE AREA 10 AND SMALL AREA 0010 FROM SEARCH TARGET → [01   0000 / 11   0010] → [01:xx0x]

REMOVING LARGE AREA 10 AND SMALL AREA 0100 FROM SEARCH TARGET → [10   0000 / 11   0100] → [10:x0xx]

WHEN REMOVING LARGE AREA 10 AND SMALL AREA 1000 FROM SEARCH TARGET → [10   0000 / 11   1000] → [10:0xxx]

FORWARDING APPARATUS, FORWARDING METHOD, AND COMPUTER PRODUCT

BACKGROUND OF THE INVENTION

1. Field of the Invention

The present invention relates to a forwarding apparatus and a forwarding method.

2. Description of the Related Art

A commonly used forwarding apparatus such as a router, a gateway, an ether switch etc., which forwards data between the forwarding apparatus itself and another forwarding apparatus via a network, uses destination data included in a received frame to search a transfer condition and forwards the frame according to the transfer condition (for example, see Japanese Patent Application Laid-open No. 2006-108985).

A specific example is explained with reference to FIG. 12. FIG. 12 is a schematic for explaining a forwarding apparatus according to a conventional technology. As shown in FIG. 12, a forwarding database (FDB), which is a storage device for searching for the transfer condition using the destination data, stores therein a frame table and a transfer condition table. To be specific, the frame table stores therein a plurality of entries by establishing a correspondence between frame identification data and an address. The frame identification data includes a virtual local area network identifier (VLAN ID) (for example, 100) that is data of a destination network, and a media access control identifier (MAC ID) (for example, A) that is data of a destination terminal. The address (for example, addr#01) is an identifier for searching for the transfer condition. The transfer condition table establishes and stores therein a correspondence between the transfer condition and the address. The transfer condition includes a destination port (for example, port#01) that is data of an output port that forwards the frame to the destination network and a process content (for example, transfer) of input data.

Upon receiving the frame, a hardware unit in the forwarding apparatus according to the conventional technology reads the VLAN ID (for example, "VLAN ID"="103") and the MAC ID (for example, "MAC"="D") (see (1) of FIG. 12). Next, the forwarding apparatus searches for the address among all the entries from the frame table. In the example that is explained with reference to FIG. 12, the forwarding apparatus checks all the entries under the condition "VLAN ID"="103" and "MAC ID"="D" (see (2) of FIG. 12) and searches for "addr#04" that is the address of the appropriate entry (see (3) of FIG. 12). Next, the forwarding apparatus uses the transfer condition table and the searched address to search for the transfer condition (for example, "port#01" and "transfer"). In the example explained with reference to FIG. 12, the forwarding apparatus checks the transfer condition table under the condition "addr#04" (see (4) of FIG. 12) and searches for the transfer condition "port#04" and "transfer" (see (5) of FIG. 12). Further, based on the searched transfer condition, the forwarding apparatus executes a transfer process on the frame (in the example shown in FIG. 12, the forwarding apparatus transfers the frame from the port#04 (see (6) of FIG. 12)).

If a structure of the network is modified, a portion of the FDB is deleted due to an operation from the forwarding apparatus according to the conventional technology or an external device, or the FDB is overwritten, thus getting updated. To be specific, if a single area on the network is annihilated, the FDB gets updated by sequentially deleting each entry related to the annihilated area using the operation from the forwarding apparatus according to the conventional technology or the external device.

However, in the conventional technology mentioned earlier, a throughput of the entire forwarding apparatus is adversely affected due to the updation of the FDB.

In other words, because the frame table in the FDB includes a combination of the VLAN ID, the MAC ID, and the address, the frame table stores therein a large amount of data, thus necessitating a content addressable memory (CAM) that is a device that exclusively stores therein the FDB. Because the forwarding apparatus according to the conventional technology updates the FDB for each single entry, the FDB needs to be repeatedly updated for the number of entries that are stored by the FDB. Thus, in the forwarding apparatus according to the conventional technology, a time period passes until the complete updation of the FDB, thereby resulting in occurrence of a time lag. Due to this, a mismatch occurs between a timing to search for the address and a timing to search for the transfer condition. Especially, when mirroring the FDB using a plurality of physically different CAM, because the FDB in the multiple CAM need to be updated at the same time, updation of the FDB requires a long time period and results in a significant mismatch at the time of searching for the transfer condition. Thus, in the forwarding apparatus according to the conventional technology, the throughput of the entire forwarding apparatus is adversely affected due to occurrence of the mismatch at the time of searching for the transfer condition.

SUMMARY OF THE INVENTION

It is an object of the present invention to at least partially solve the problems in the conventional technology.

According to an aspect of the present invention, an apparatus for forwarding a frame according to a transfer condition includes a transfer-condition storage unit that stores therein, destination data that is likely to be included in the frame, area data indicating an area of destination indicated by the destination data, and the transfer condition in such a way that the area data and the transfer condition are associated with the destination data; a deleted-area data storage unit that stores therein as deleted area data, the area data that is assigned to data to be deleted from the transfer-condition storage unit; and a transfer-condition searching unit that removes, from a search target, an area to which the deleted area data stored in the deleted-area data storage unit is assigned, to search, from the transfer-condition storage unit, for the transfer condition corresponding to the destination data that is included in the frame.

According to another aspect of the present invention, a method for forwarding a frame according to a transfer condition includes storing in a transfer-condition storage unit, destination data that is likely to be included in the frame, area data indicating an area of destination indicated by the destination data, and the transfer condition in such a way that the area data and the transfer condition are associated with the destination data; storing in a deleted-area data storage unit, as deleted area data, the area data that is assigned to data to be deleted from the transfer-condition storage unit; and removing, from a search target, an area to which the deleted area data stored in the deleted-area data storage unit is assigned, to search, from the transfer-condition storage unit, for the transfer condition corresponding to the destination data that is included in the frame.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B are schematics of an example of data that is stored in a transfer-condition storage unit;

FIGS. 10A and 10B are schematics for explaining a process performed by a transfer-condition searching unit according to a second embodiment of the present invention;

DETAILED DESCRIPTION OF THE PREFERRED EMBODIMENTS

Exemplary embodiments of the forwarding apparatus, the forwarding method, and the forwarding program according to the present invention are explained in detail below with reference to the accompanying drawings. In the embodiments explained below, the present invention is applied to a forwarding apparatus (for example, a router, a gateway, an ether switch etc.) that uses destination data included in a received frame to search a transfer condition, and forwards the frame according to the transfer condition.

In a first embodiment of the present invention explained below, an overview and a salient feature of the forwarding apparatus according to the first embodiment, a structure of the forwarding apparatus, and a process flow of the forwarding apparatus are sequentially explained, and effects of the first embodiment are explained in the end.

Figure 1:
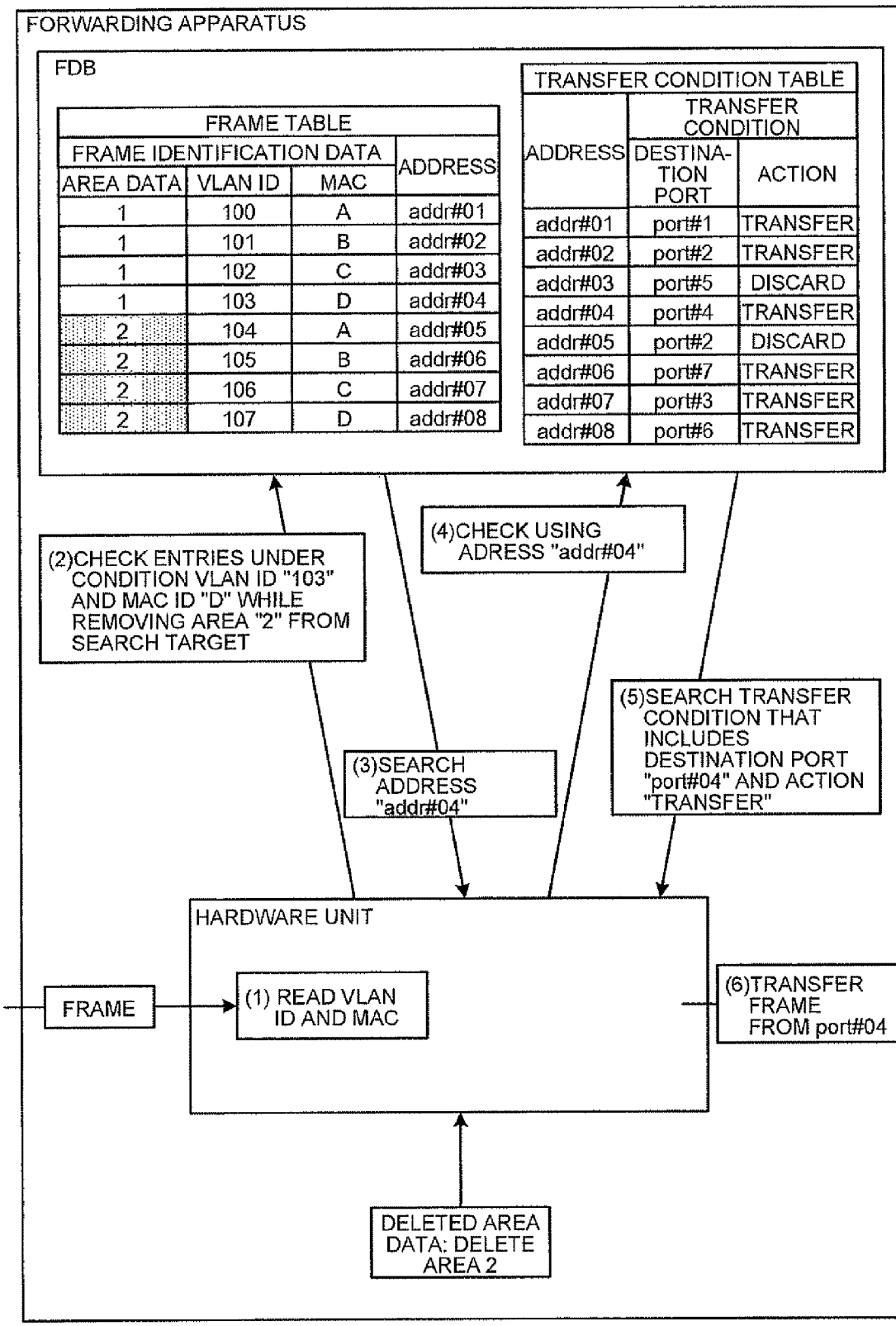
FIG. 1 is a schematic for explaining an overview and a salient feature of a forwarding apparatus according to a first embodiment of the present invention.

The overview and the salient feature of the forwarding apparatus according to the first embodiment are explained with reference to FIG. 1. FIG. 1 is a schematic for explaining the overview and the salient feature of the forwarding apparatus according to the first embodiment.

As shown in FIG. 1, the forwarding apparatus according to the first embodiment uses the destination data that is included in the received frame to search for the transfer condition and forwards the frame according to the transfer condition. Based on the salient feature, the forwarding apparatus smoothly forwards input data to another forwarding apparatus without carrying out an updation of a forwarding database (FDB).

The salient feature is explained next. The forwarding apparatus according to the first embodiment establishes and stores therein, for each destination data that is likely to be included in the frame, a correspondence among area data that indicates an affiliated area of a destination, the destination data, and the transfer condition. To be specific, as shown in FIG. 1, a frame table in the FDB, which is a storage device for searching for the transfer condition using the destination data, establishes and stores therein as a plurality of entries, a correspondence among the area data, frame identification data, and an address. The area data (for example, 1) indicates the affiliated area of the destination. The frame identification data includes a virtual local area network identifier (VLAN ID) (for example, 100) that is data of a destination network, and a media access control identifier (MAC ID) (for example, A) that is data of a destination terminal. The address (for example, addr#01) is an identifier for searching for the transfer condition. Further, a transfer condition table in the FDB establishes and stores therein a correspondence between the transfer condition and the address. The transfer condition includes a destination port (for example, port#01) that is data of an output port that forwards the frame to the destination network and a process content (for example, transfer) of input data.

The forwarding apparatus according to the first embodiment stores therein as deleted area data, the area data that is assigned to data that is to be deleted. To be specific, if the structure of the network is modified, the forwarding apparatus according to the first embodiment stores therein as the deleted area data, the area data that is assigned to the data that is transmitted from another transmitter and that is to be deleted (for example, "delete area 2").

When searching for the transfer condition corresponding to the destination data that is included in the received frame, the forwarding apparatus according to the first embodiment removes from a search target, the area to which the deleted area data is assigned, and searches for the transfer condition. To be specific, upon receiving the frame, the hardware unit in the forwarding apparatus according to the first embodiment reads the VLAN ID (for example, "VLAN ID"="103") and the MAC ID (for example, "MAC"="D") from the frame (see (1) of FIG. 1). Next, the forwarding apparatus according to the first embodiment searches for the address while removing from the search target, the area that is stored in the frame table as the deleted area data. In the example shown in FIG. 1, the forwarding apparatus checks all the entries under the condition "VLAN ID"="103" and "MAC ID"="D" while removing from the search target, the entry that includes area "2" (see (2) of FIG. 1), and searches for "addr#04" that is the address of the suitable entry (see (3) of FIG. 1). Next, the forwarding apparatus according to the first embodiment uses the transfer condition table and the searched address to search for the transfer condition (for example, "port#01" and "transfer"). In the example shown in FIG. 1, the forwarding apparatus checks the transfer condition table under the condition "addr#04" (see (4) of FIG. 1) and searches for the transfer condition "port#04" and "transfer" (see (5) of FIG. 1). Next, based on the searched transfer condition, the forwarding apparatus executes the transfer process on the frame (in the example shown in FIG. 1, the forwarding apparatus transfers the frame from the port#04 (see (6) of FIG. 1).

Thus, based on the salient feature mentioned earlier, the forwarding apparatus according to the first embodiment can smoothly forward the input data to another forwarding apparatus without carrying out updation of the FDB. In other words, when searching for the transfer condition, the forwarding apparatus removes from the search target, the area that is to be deleted. Due to this, the forwarding apparatus can smoothly forward the input data to another forwarding apparatus without carrying out updation of the FDB that adversely affects the throughput of the entire forwarding apparatus.

Figure 2:
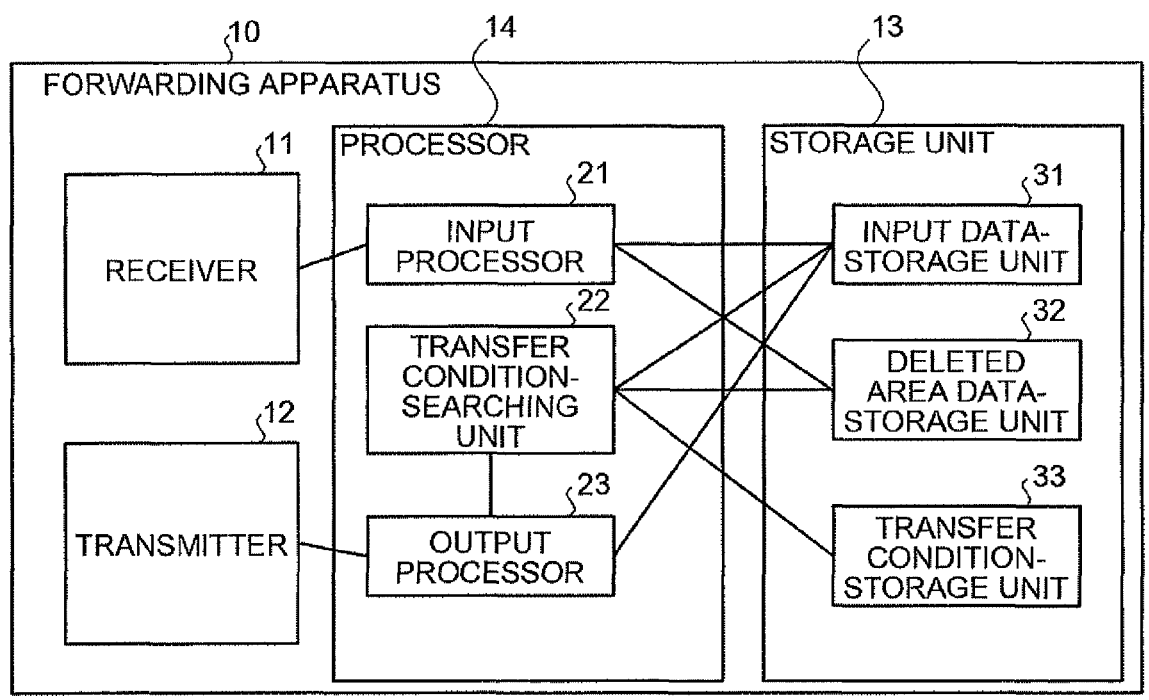
FIG. 2 is a block diagram of the forwarding apparatus according to the first embodiment.

The structure of the forwarding apparatus according to the first embodiment is explained next with reference to FIG. 2. FIG. 2 is a block diagram of the forwarding apparatus according to the first embodiment. As shown in FIG. 2, a forwarding apparatus 10 includes a receiver 11, a transmitter 12, a storage unit 13, and a processor 14. In the example explained below, data in a bitmap format, which can be uniquely identified among the respective area data, is stored as the area data.

The receiver 11 receives data from another forwarding apparatus. To be specific, the receiver 11 includes a single receiving port or a plurality of receiving ports and receives the frame that is transmitted from the other forwarding apparatus.

The transmitter 12 transmits the data to another forwarding apparatus. To be specific, the transmitter 12 includes a single transmitting port or a plurality of transmitting ports, and transmits to the other forwarding apparatus, the frame that is received by the receiver 11.

The storage unit 13 stores therein data that is necessary for various processes by the processor 14. As shown in FIG. 2, the storage unit 13 includes an input data-storage unit 31, a deleted-area data storage unit 32, and a transfer-condition storage unit 33 that are closely related to the present invention. The deleted-area data storage unit 32 corresponds to "deleted-area data storage unit" that is described in claims and the transfer-condition storage unit 33 corresponds to "transfer-condition storage unit" that is described in claims.

The input data-storage unit 31 stores therein various types of data related to the input data. To be specific, for example, the input data-storage unit 31 is equivalent to a buffer memory and stores therein the frame that is received from an input processor 21.

The deleted-area data storage unit 32 stores therein as the deleted area data, the area data that is assigned to the data that is to be deleted from the transfer-condition storage unit 33. To be specific, if the structure of the network is modified and the deleted-area data storage unit 32 receives from outside the forwarding apparatus, an instruction to delete the area data from the transfer-condition storage unit 33, the deleted-area data storage unit 32 stores therein the area data as the deleted area data.

For example, if an area represented as area "0001" on the network is destroyed and the deleted-area data storage unit 32 receives from outside the forwarding apparatus, an instruction to delete the entry related to the area "0001" from the transfer-condition storage unit 33, the deleted-area data storage unit 32 stores therein the area data "0001".

The transfer-condition storage unit 33 establishes and stores therein, for each destination data that is likely to be included in the frame, a correspondence among the area data that indicates the affiliated area of the destination, the destination data, and the transfer condition. To be specific, in an example shown in FIGS. 3A and 3B, the transfer-condition storage unit 33 stores therein as the FDB, the frame table (see FIG. 3A) and the transfer condition table (see FIG. 3B). The frame table stores therein the multiple entries by establishing a correspondence between the frame identification data and the address. The frame identification data includes the area data (for example, 0001), the VLAN ID (for example, 100) that is data of the destination network, and the MAC ID (for example, A) that is data of the destination terminal. The address (for example, addr#01) is the identifier for searching for the transfer condition. Further, the transfer condition table establishes and stores therein a correspondence between the transfer condition and the address. The transfer condition includes the destination port (for example, port#01) that is data of the output port that forwards the frame to the destination network and the process content (for example, transfer) of the input data. FIGS. 3A and 3B are schematics of an example of data that is stored in the transfer-condition storage unit 33.

The area data in the frame table is stored as data in the bitmap format that can be uniquely identified among the respective area data. To be specific, the area data is stored such that the area data includes "1" only at a single place in each bit position to ensure that the area data does not overlap with other area data. For example, as shown in FIG. 3A, the area "0001" is stored such that the area "0001" includes "1" at only a single place and at the bit position that differs from an area "0010", an area "0100", and an area "1000" to ensure that the area "0001", does not overlap with the other areas.

The processor 14 includes an internal memory for storing therein computer programs that regulate various process sequences and predetermined data. The processor 14 uses the computer programs and the predetermined data to execute various processes. The processor 14 includes the input processor 21, a transfer-condition searching unit 22, and an output processor 23 that are closely related to the present invention. The transfer-condition searching unit 22 corresponds to "transfer-condition searching unit" that is described in claims.

The input processor 21 processes the data that is input into the receiver 11. To be specific, if the structure of the network is modified and the input processor 21 receives from outside the forwarding apparatus, an instruction to delete the area data from the transfer-condition storage unit 33, the input processor 21 writes the area data to the deleted-area data storage unit 32 as the deleted area data. Further, upon receiving a frame for transfer, the input processor 21 writes the frame to the input data-storage unit 31.

When searching from the transfer-condition storage unit 33, the transfer condition corresponding to the destination data that is included in the received frame, the transfer-condition searching unit 22 searches for the transfer condition by removing from the search target, the area that is indicated by the assigned deleted area data that is stored in the deleted-area data storage unit 32. To be specific, the transfer-condition searching unit 22 reads the VLAN ID and the MAC ID from the input data-storage unit 31, reads the deleted area data from the deleted-area data storage unit 32, and generates a search key and a mask key that are used to search the frame table. Next, based on a comparison condition, which is obtained by checking the search key and the mask key, and that is used for searching the frame table, the transfer-condition searching unit 22 searches for the address from the frame table while removing the deleted area from the search target. Further, the transfer-condition searching unit 22 uses the transfer condition table and the address to search for the transfer condition, and transmits the transfer condition to the output processor 23.

A process performed by the transfer-condition searching unit 22 is explained with reference to FIGS. 4A to 7. FIGS. 4A to 7 are schematics for explaining the process performed by the transfer-condition searching unit 22 according to the first embodiment. Below, if the frame identification data in the search key, for example, includes the deleted area "0100", the VLAN ID "103", and the MAC ID "D", the search key is indicated by "0100:103:D". Further, "0" or "1" in the area data of the search key corresponds to "0" or "1" in the frame table respectively. Further, "x" can correspond to any one of "0" and "1" in the frame table.

Further, "0" or "1" of the mask key indicates whether the transfer-condition searching unit 22 generates the comparison condition using the search key. For example, if a first bit of the mask key is "0", regardless of whether a first bit of the search key is "0" or "1", the transfer-condition searching unit 22 generates the comparison condition in which a first bit is "x". If the first bit of the mask key is "1" and the first bit of the search key is "0", the transfer-condition searching unit 22 generates the comparison condition in which the first bit is "0". Further, "all '1'" in the mask key indicates that the transfer-condition searching unit 22 generates the comparison condition with the data in the search key. Further, "Don't care" in the search key indicates that the search key corresponds to a combination of any data (for example, "0001", "0010", "1" etc.).

Figure 4A:
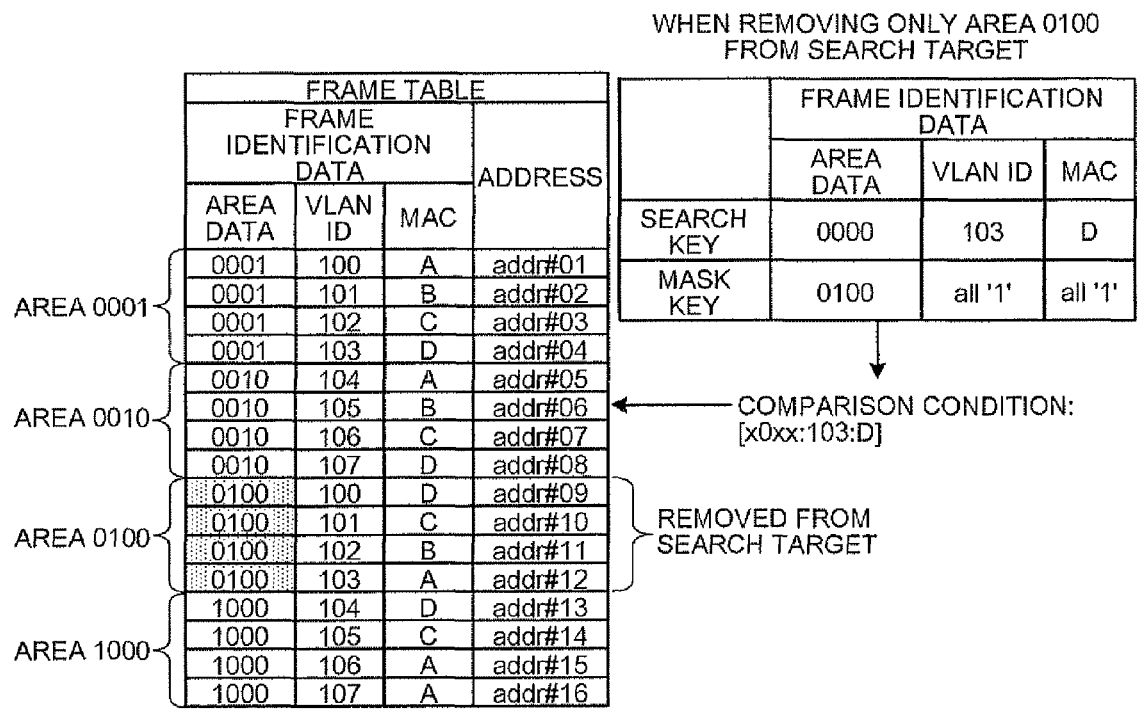
FIGS. 4A and 4B are schematics for explaining a process performed by a transfer-condition searching unit according to the first embodiment.

As shown in FIG. 4A, under the assumptions mentioned earlier, if the transfer-condition searching unit 22 reads the VLAN ID "103" and the MAC ID "D" from the input data-storage unit 31, and reads the deleted area "0100" from the deleted-area data storage unit 32, in other words, in the example of the frame table shown in FIG. 4A, if only the area 0100 is to be removed from the search target, the transfer-condition searching unit 22 generates the search key "0000:103:D" and the mask key "0100:all '1':all '1'". Next, the transfer-condition searching unit 22 checks the search key and the mark key to generate a comparison condition "x0xx:103:D". Further, based on the comparison condition "x0xx:103:D", the transfer-condition searching unit 22 searches from the frame table, for the address that includes the VLAN ID "103" and the MAC ID "D" while removing from the search target, the entry "x1xx" as the area data in the frame table. In other words, in the example of the frame table shown in FIG. 4A, the transfer-condition searching unit 22 removes as the area data, the entry that includes "0100".

Figure 4B:
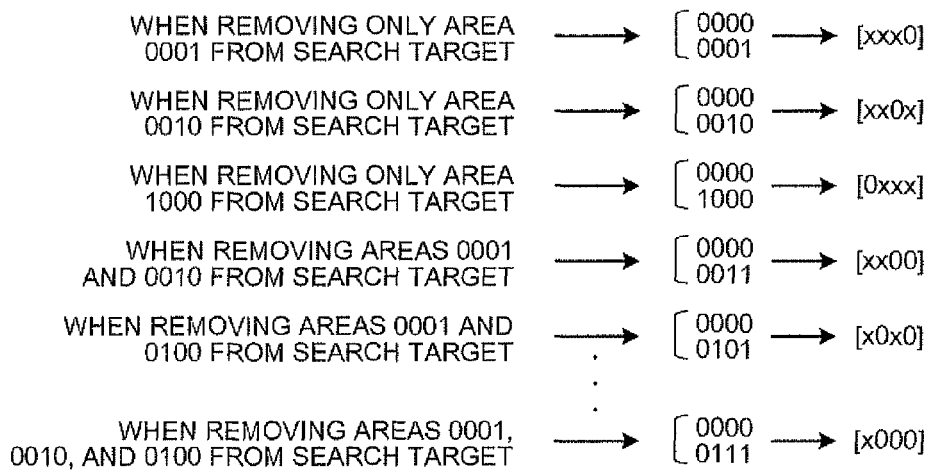

An example of a relation between the area that is removed from the search target, the area data in the search key and the mask key, and the area data in the comparison condition is explained with reference to FIG. 4B. For example, if the area "0001" is to be removed from the search target, the search key is "0000", the mask key is "0001", and the area data in the comparison condition is "xxx0". Further, if the area "0001" and the area "0010" are to be removed from the search target, the search key is "0000", the mask key is "0011", and the area data in the comparison condition is "xx00". Further, if the area "0001", the area "0010", and the area "0100" are to be removed from the search target, the search key is "0000", the mask key is "0111", and the area data in the comparison condition is "x000". Thus, using "0000" as the search key and generating the mask key by including "1" in the bit position corresponding to the area to be removed enables to remove the desired area from the search target.

Figure 5:
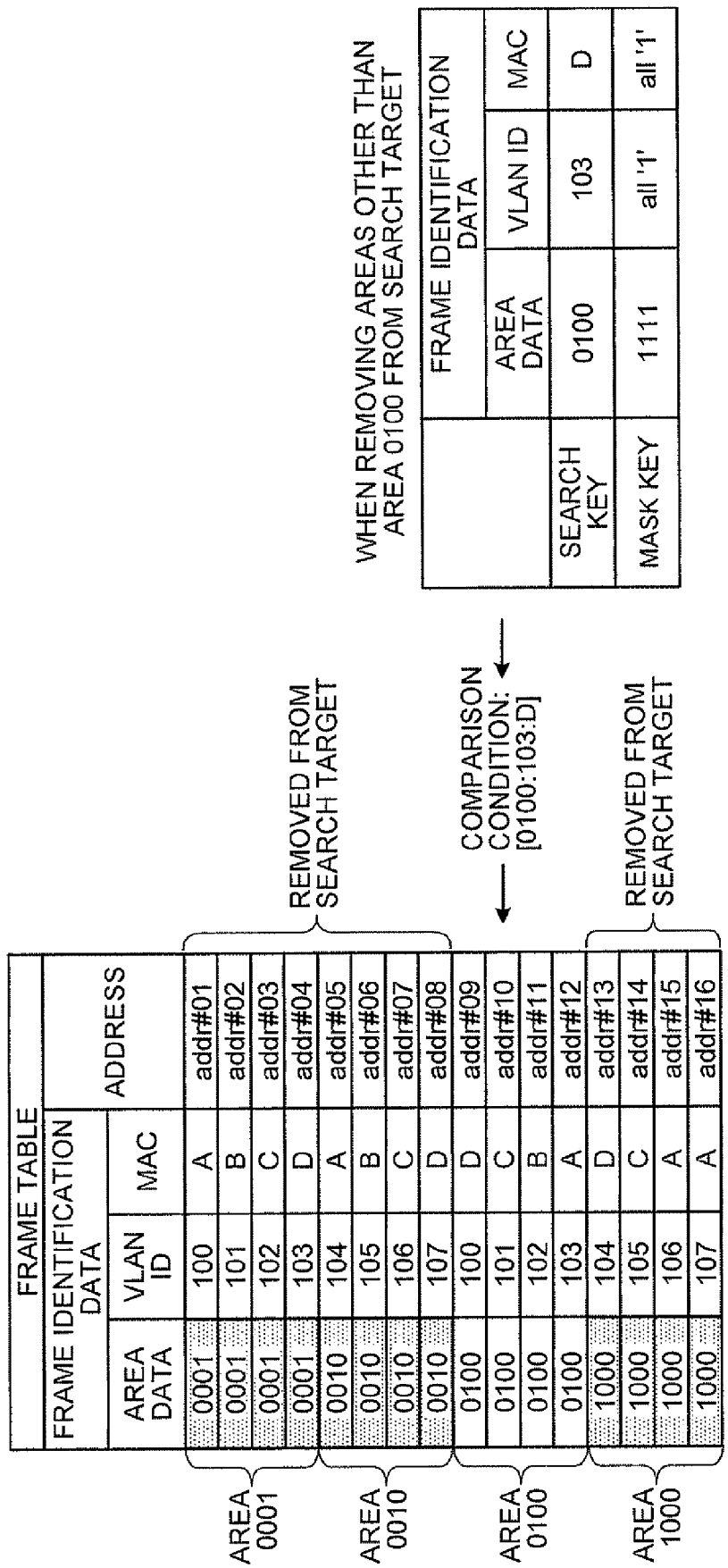
FIG. 5 is another schematic for explaining the process performed by the transfer-condition searching unit according to the first embodiment.

Further, as shown in FIG. 5, for example, if the transfer-condition searching unit 22 reads the VLAN ID "103" and the MAC ID "D" from the input data-storage unit 31, and reads the deleted areas "0001", "0010", and "1000" from the deleted-area data storage unit 32, in other words, in the example of the frame table shown in FIG. 5, if the areas other than the area 0100 are to be removed from the search target, the transfer-condition searching unit 22 can also generate the search key "0100:103:D" and the mask key "1111:all '1':all '1'". Further, the transfer-condition searching unit 22 checks the search key and the mask key and generates the comparison condition "0100:103:D". Next, based on the comparison condition "0100:103:D", the transfer-condition searching unit 22 searches from the frame table, for the address that includes the VLAN ID "103" and the MAC ID "D" while removing from the search target, the entries other than the entry "0100" as the area data in the frame table. In other words, in the example of the frame table shown in FIG. 5, the transfer-condition searching unit 22 removes as the area data in the frame table, the entries "0001", "0010", and "1000". Thus, using "1111" as the mask key and generating the search key by including "1" in the bit position corresponding to the only area that is to be searched enables to remove the desired areas from the search target.

Figure 6:
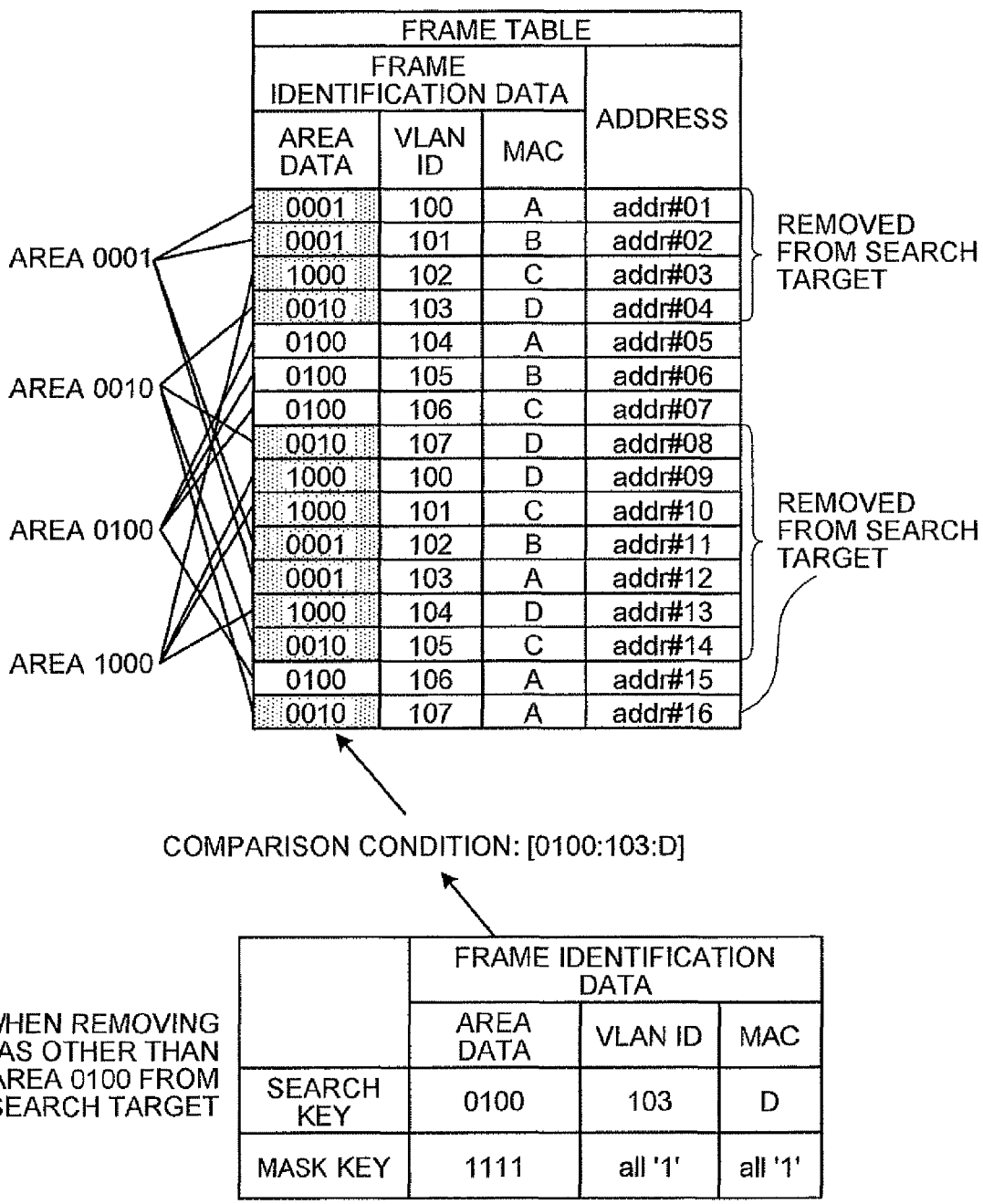
FIG. 6 is yet another schematic for explaining the process performed by the transfer-condition searching unit according to the first embodiment.

Further, as shown in FIG. 6, for example, if the area data in the frame area data are discontinuously arranged and if the transfer-condition searching unit 22 reads the VLAN ID "103" and the MAC ID "D" from the input data-storage unit 31, and reads the deleted areas "0001", "0010", and "1000" from the deleted-area data storage unit 32, in other words, in the example of the frame table shown in FIG. 6, if the areas other than the area 0100 are to be removed from the search target, the transfer-condition searching unit 22 can also generate the search key "0100:103:D" and the mask key "1111:all '1':all '1'". Further, the transfer-condition searching unit 22 checks the search key and the mask key and generates the comparison condition "0100:103:D". Next, based on the comparison condition "0100:103:D", the transfer-condition searching unit 22 searches from the frame table, for the address that includes the VLAN ID "103" and the MAC ID "D" while removing from the search target, the entries other than the entry "0100" as the area data in the frame table. In other words, in the example of the frame table shown in FIG. 6, the transfer-condition searching unit 22 removes as the area data in the frame table, the entries "0001", "0010", and "1000". Thus, even if the area data are discontinuously arranged, the desired areas can be removed from the search target.

Figure 7:
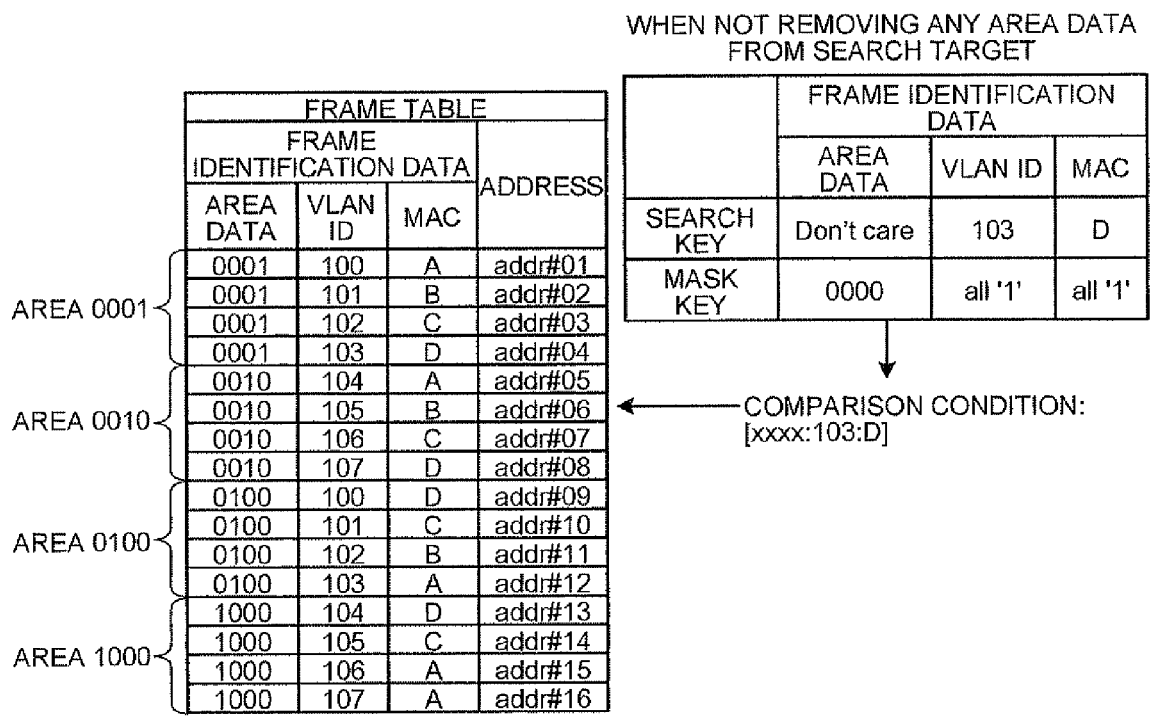
FIG. 7 is yet another schematic for explaining the process performed by the transfer-condition searching unit according to the first embodiment.

Further, as shown in FIG. 7, for example, if the transfer-condition searching unit 22 reads the VLAN ID "103" and the MAC ID "D" from the input data-storage unit 31, and the deleted area does not exist, in other words, in the example of the frame table shown in FIG. 7, if no area data is to be removed from the search target, the transfer-condition searching unit 22 can also generate the search key "Don't care:103:D" and the mask key "0000:all '1':all '1'". Further, the transfer-condition searching unit 22 checks the search key and the mask key and generates the comparison condition "xxxx:103:D". Next, based on the comparison condition "xxxx:103:D", the transfer-condition searching unit 22 searches from the frame table, for the address that includes the VLAN ID "103" and the MAC ID "D" without removing any area data in the frame table from the search target. Thus, even if the deleted area does not exist, using the search key "Don't care" and the mask key "0000" enables to search for the address without an error.

The output processor 23 executes an output process on the frame for transfer. To be specific, based on a search condition received from the transfer-condition searching unit 22, the output processor 23 executes the output process on the frame that is read from the input data-storage unit 31. For example, upon receiving the search condition "port#04" and "transfer" from the transfer-condition searching unit 22, the output processor 23 transfers from the port#04 in the transmitter 12, the frame that is read from the input data-storage unit 31. Further, for example, upon receiving the search condition "port 2" and "discard" from the transfer-condition searching unit 22, the output processor 23 discards the frame that is read from the input data-storage unit 31.

Figure 8:
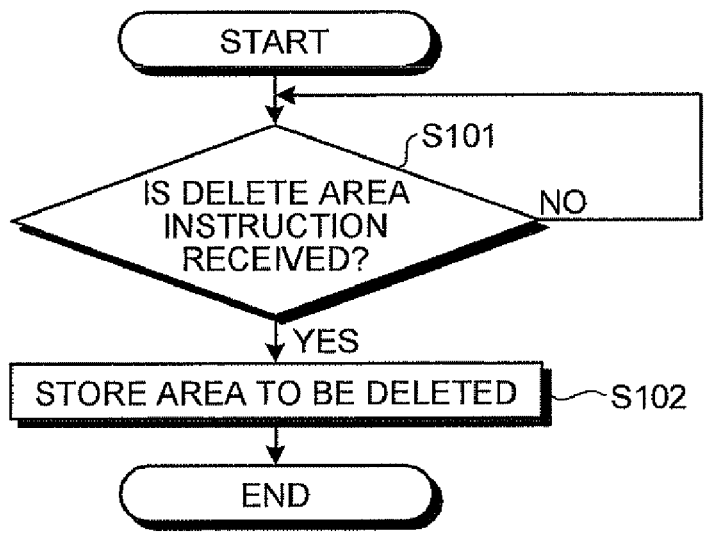
FIG. 8 is a flowchart of an area data receiving process that is performed by the forwarding apparatus according to the first embodiment.
Figure 9:
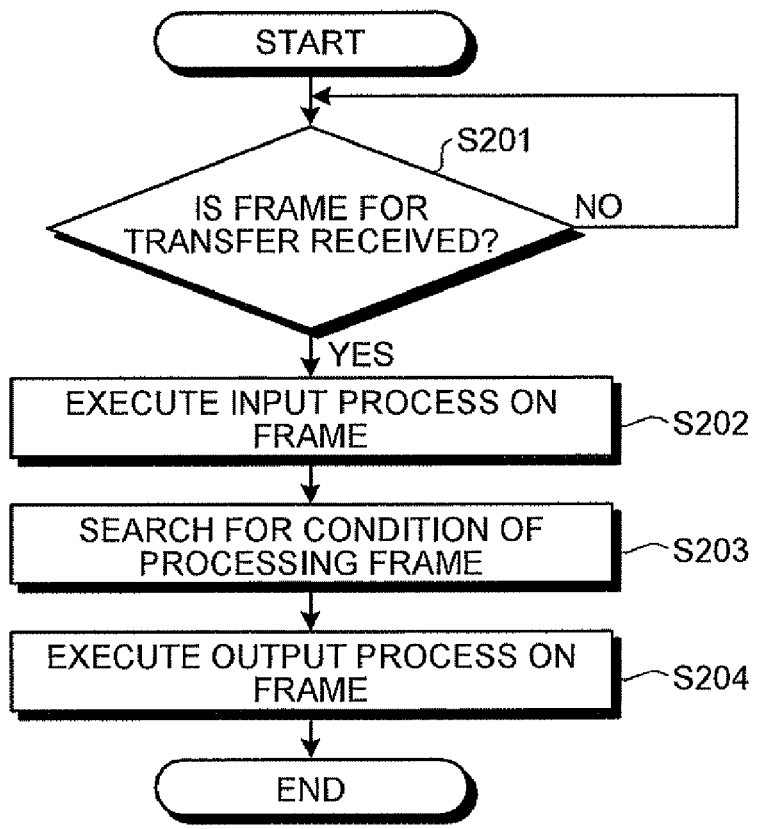
FIG. 9 is a flowchart of a frame transfer process performed by the forwarding apparatus according to the first embodiment.

The process performed by the forwarding apparatus 10 according to the first embodiment is explained next with reference to FIGS. 8 and 9. FIG. 8 is a flowchart of an area data receiving process that is performed by the forwarding apparatus 10 according to the first embodiment. FIG. 9 is a flowchart of a frame transfer process performed by the forwarding apparatus 10 according to the first embodiment.

As shown in FIG. 8, upon the structure of the network being modified and the forwarding apparatus 10 receiving from outside, an instruction to delete the area data from the transfer-condition storage unit 33 (Yes at step S101), the input processor 21 writes the assigned area data to the deleted-area data storage unit 32 as the deleted area data (step S102) and the forwarding apparatus 10 ends the area data receiving process.

As shown in FIG. 9, upon the forwarding apparatus 10 receiving the frame for transfer (Yes at step S201), the input processor 21 executes an input process on the frame (step S202). In other words, upon receiving the frame for transfer, the input processor 21 writes the frame to the input data-storage unit 31.

Next, the transfer-condition searching unit 22 searches for the condition to process the frame (step S203). In other words, the transfer-condition searching unit 22 reads the VLAN ID, the MAC ID, and the deleted area data, and generates the search key and the mask key. Next, based on the comparison condition, the transfer-condition searching unit 22 searches for the address from the frame table while removing the deleted area from the search target, searches for the transfer condition, and transmits the transfer condition to the output processor 23.

Next, the output processor 23 executes the output process on the frame for transfer (step S204) and the forwarding apparatus 10 ends the process. In other words, based on the transfer condition that is received from the transfer-condition searching unit 22, the output processor 23 executes the output process on the frame that is read from the input data-storage unit 31 and the forwarding apparatus 10 ends the frame transfer process.

According to the first embodiment, the forwarding apparatus 10 establishes and stores therein, for each destination data that is likely to be included in the frame, a correspondence among the area data that indicates the affiliated area of the destination, the destination data, and the transfer condition. The forwarding apparatus 10 stores therein as the deleted area data, the area data that is assigned to the data that is to be deleted from the transfer-condition storage unit 33. When searching from the transfer-condition storage unit 33, the transfer condition that corresponds to the destination data that is included in the received frame, the forwarding apparatus 10 searches for the transfer condition by removing from the search target, the area that is assigned the deleted area data that is stored in the deleted-area data storage unit 32. Due to this, the forwarding apparatus 10 can smoothly forward the input data to another forwarding apparatus without updating the FDB. In other words, when searching for the transfer condition, removing from the search target, the area that is to be deleted enables to smoothly forward the input data to the other forwarding apparatus without updating the FDB that is likely to adversely affect the throughput of the entire forwarding apparatus.

Further, according to the first embodiment, the transfer-condition storage unit 33 and the deleted-area data storage unit 32 store therein as the area data, the data in the bitmap format that can be uniquely identified among the respective area data. Further, the transfer-condition searching unit 22 searches for the transfer condition from the transfer-condition storage unit 33 by using the area data of the bitmap format such that the area that is assigned the deleted area data is removed from the search target and only the other areas are treated as the search target. Due to this, the area, which is treated as the search target, can be easily specified in the bitmap format.

Storing the area data in a single layered structure is explained in the first embodiment. However, the present invention is not to be thus limited, and the area data can also be stored in a hierarchical structure. Storing the area data in the hierarchical structure and in the bitmap format is explained as a second embodiment of the present invention with reference to FIGS. 10A and 10B. FIGS. 10A and 10B are schematics for explaining a process performed by a transfer-condition searching unit according to the second embodiment.

A salient feature of a forwarding apparatus according to the second embodiment is explained first. According to the salient feature, the forwarding apparatus according to the second embodiment flexibly specifies for each layer, the area that is treated as the search target. In other words, the forwarding apparatus according to the second embodiment stores therein the area data that includes the hierarchical structure. To be specific, the frame table in the FDB stores therein the frame identification data that includes a large area (for example, 01) that is affiliated to the destination and that includes a plurality of small areas, small area data that indicates the affiliated area of the destination (for example, 0001), the VLAN ID (for example, 100), and the MAC ID (for example, A).

Further, the forwarding apparatus according to the second embodiment stores therein the deleted area data for each layer. To be specific, if the network structure is modified, the forwarding apparatus stores as the deleted area data for each layer, the area data that is assigned to the data that is transmitted from another forwarding apparatus and that is to be deleted (for example, "delete large area 01" or "delete small area 0001" etc.).

Next, the forwarding apparatus according to the second embodiment searches for the transfer condition by removing from the search target, the area of a layer to which the deleted area data is assigned. To be specific, the forwarding apparatus searches for the address while removing from the search target, the area that is stored for each layer as the deleted area data from the frame table. For example, by searching for the address while removing the large area 01 from the search target, the forwarding apparatus searches for the address while simultaneously removing from the search target, a small area 0001 and a small area 0010 that are affiliated to the large area 01.

Thus, based on the salient feature mentioned earlier, the forwarding apparatus according to the second embodiment can flexibly specify for each layer, the area that is treated as the search target. In other words, flexibly specifying for each layer, the area that is treated as the search target enables to flexibly remove from the search target for each layer, the area that is to be deleted when searching for the transfer condition, thus enabling to smoothly forward the input data to another forwarding apparatus without carrying out updation of the FDB that adversely affects the throughput of the entire forwarding apparatus.

A structure of the forwarding apparatus according to the second embodiment is explained next. The structure of the forwarding apparatus according to the second embodiment is similar to the structure of the forwarding apparatus 10 according to the first embodiment. Further, an operation of the forwarding apparatus according to the second embodiment is similar to the operation of the forwarding apparatus 10 according to the first embodiment except the deleted-area data storage unit 32, the transfer-condition storage unit 33, and the transfer-condition searching unit 22 that are explained below.

The deleted-area data storage unit 32 stores therein as the deleted area data for each layer, the area data that is assigned to the data that is to be deleted from the transfer-condition storage unit 33. To be specific, if the structure of the network is modified and the deleted-area data storage unit 32 receives from outside the forwarding apparatus (for example, from another forwarding apparatus or a controller), an instruction to delete the area data from the transfer-condition storage unit 33, the deleted-area data storage unit 32 stores therein as the deleted area data for each layer, the data of the area.

For example, if an area represented as a large area "01" on the network is destroyed and the deleted-area data storage unit 32 receives from outside the forwarding apparatus, an instruction to delete the entry related to the large area "01" from the transfer-condition storage unit 33, the deleted-area data storage unit 32 stores therein the area data "01".

The transfer-condition storage unit 33 stores therein the area data that includes the hierarchical structure. To be specific, the transfer-condition storage unit 33 stores in the frame table included therein, for each destination data that is likely to be included in the frame, the area data. The area data indicates the data to which the destination is affiliated. The area data includes the large area data that includes a plurality of small areas and the small areas that indicate the affiliated areas of the destination. Next, the transfer-condition storage unit 33 establishes and stores therein a correspondence between the frame data, which includes the area data and the destination data, and the transfer condition.

For example, the transfer-condition storage unit 33 stores in the frame table, the area data that includes the large area data "01" and the small area "0001". Further, the transfer-condition storage unit 33 establishes and stores therein a correspondence among the area data, the frame identification data that includes the VLAN ID "100" and the MAC ID "A", and the address "addr#01".

The transfer-condition searching unit 22 searches for the transfer condition by removing from the search target, the area of the layer to which the deleted area data is assigned. A process performed by the transfer-condition searching unit 22 is explained with reference to FIGS. 10A and 10B. FIGS. 10A and 10B are schematics for explaining the process performed by the transfer-condition searching unit 22 according to the second embodiment. If the frame identification data in the search key, for example, includes the large area "01", the small area "0100", the VLAN ID "103", and the MAC ID "D", the search key is indicated by "01:0100:103:D".

As shown in FIG. 10A, under the assumptions mentioned earlier, if the transfer-condition searching unit 22 reads the VLAN ID "103" and the MAC ID "D" from the input data-storage unit 31, and reads the deleted area "large area:10" from the deleted-area data storage unit 32, in other words, in the example of the frame table shown in FIG. 10A, if the large area 10 is to be deleted from the search target, the transfer-condition searching unit 22 generates the search key "01: Don't care:103:D" that includes the area data formed of the hierarchical structure and the mask key "11:000:all '1':all '1'" that includes the area data formed of the hierarchical structure. Next, the transfer-condition searching unit 22 checks the search key and the mark key to generate a comparison condition "01:xxxx:103:D". Further, in the example of the frame table shown in FIG. 10A, based on the comparison condition "01:xxxx:103:D", the transfer-condition searching unit 22 searches from the frame table, for the address that includes the VLAN ID "103" and the MAC ID "D" while removing from the search target, the entry that includes "10" as the large area data from the frame table.

An example of a relation between the area that is removed from the search target, the area data in the search key and the mask key, and the area data in the comparison condition is explained with reference to FIG. 10B. For example, if the large area "01" is to be removed from the search target, the search key is "10:Don't care", the mask key is "11:0000", and the area data in the comparison condition is "10:xxxx". Further, if the large area "10" and the small area "0001" are to be removed from the search target, the search key is "01:0000", the mask key is "11:0001", and the area data in the comparison condition is "01:xxx0". Thus, using a combination of the large area and the small area to specify the area that is the search target enables to flexibly remove the desired area from the search target.

According to the second embodiment, the transfer-condition storage unit 33 stores therein the area data that includes the hierarchical structure. The deleted-area data storage unit 32 stores therein the deleted area data for each layer. The transfer-condition searching unit 22 searches for the transfer condition by removing from the search target, the area of the layer to which the deleted area data is assigned. Due to this, the search target area can be flexibly specified for each layer. In other words, flexibly specifying the search target area for each layer enables, at the time of searching for the transfer condition, to flexibly remove from the search target for each layer, the area that is to be deleted and enables to smoothly forward the input data to another forwarding apparatus without carrying out updation of the FDB that adversely affects the throughput of the entire forwarding apparatus.

The embodiments of the present invention are explained. However, various modifications can be made other than the specific details and representative embodiments shown and described herein. Other embodiments are explained below as a third embodiment of the present invention.

The area data which is explained in the first and the second embodiments includes "1" only at a single place in each bit position. However, the present invention is not to be thus limited, and the area data can also include "1" at a plurality of places in each bit position. In other words, for example, the area data can also be stored by including "1" at multiple places in each bit position such as "0110" or "0101" without causing the area data to overlap with other areas.

Further, the area data, which is explained in the first and the second embodiments, is in the bitmap format. However, the present invention is not to be thus limited, and the area data can also be stored as sequential data (for example, "1", "2", "3" and so on).

Further, in the second embodiment, the large area and the small area in the area data are stored in the bitmap format. However, the present invention is not to be thus limited, and the area data can also be stored using a combination of data in the bitmap format and the sequential data.

Further, the sequence of processes, the sequence of controls, specific names, and data including various parameters (for example, the VLAN ID that are shown in FIG. 1, FIGS. 3A to 7, and FIGS. 10A and 10B) can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used (for example, the input data-storage unit 31 and the deleted-area data storage unit 32 that are shown in FIG. 2 can be integrated). The process functions performed by the apparatus are entirely or partially realized by a central processing unit (CPU) or a program executed by the CPU or by a hardware using wired logic.

Figure 11:
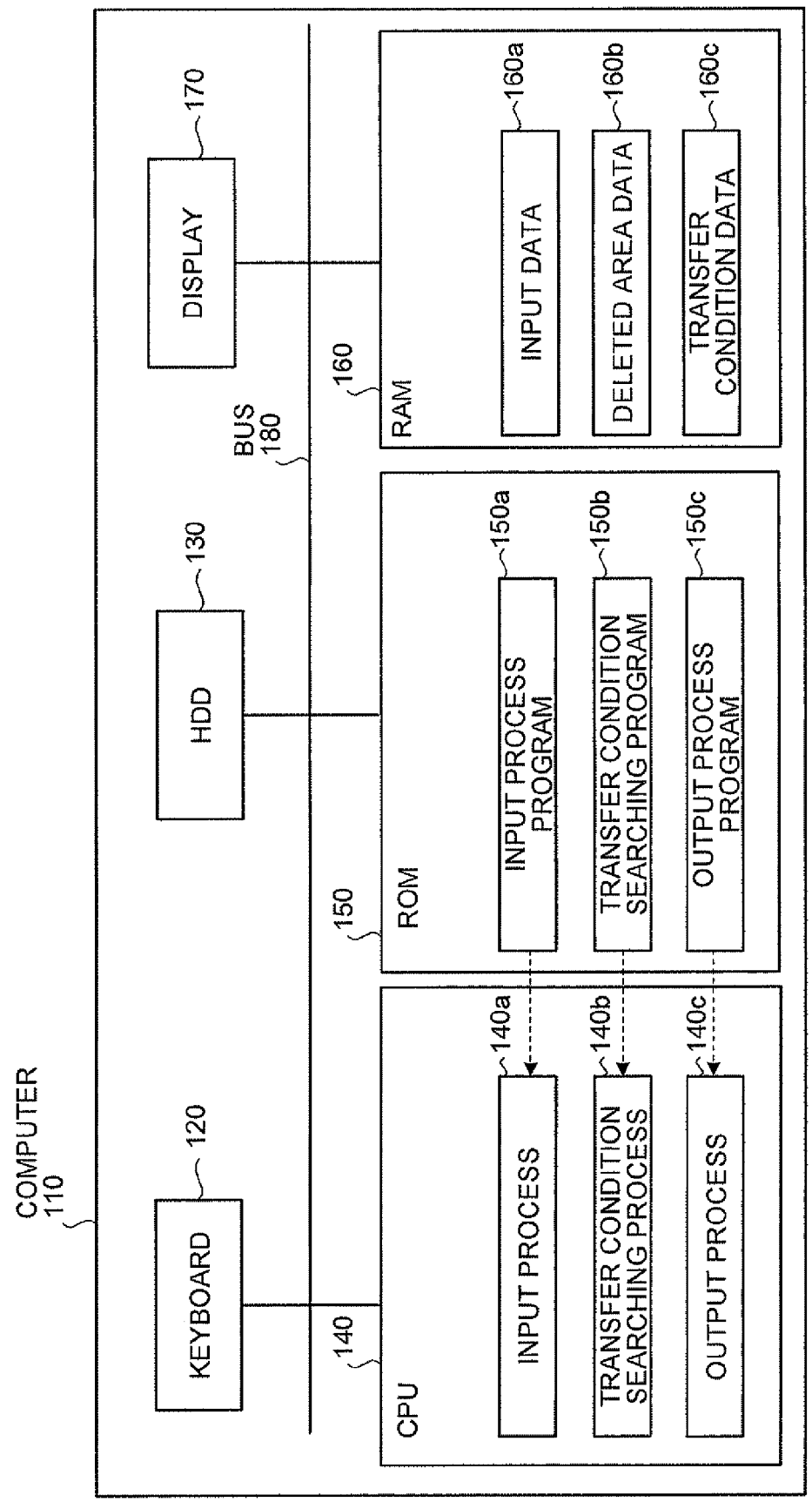
FIG. 11 is a block diagram of a computer that executes a forwarding program.
Figure 12:
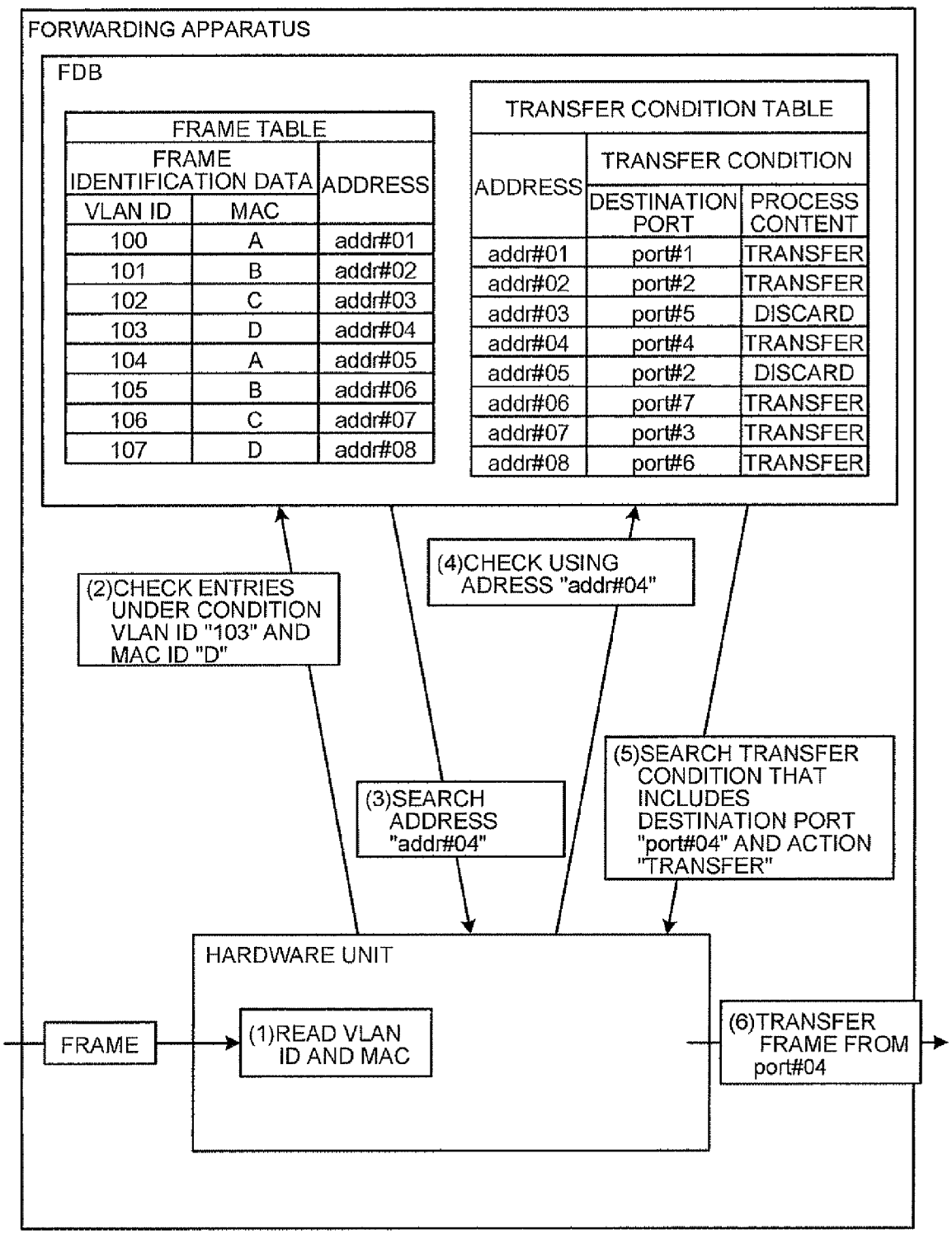
FIG. 12 is a schematic for explaining a forwarding apparatus according to a conventional technology.

Realizing the various processes using the hardware logic is explained in the embodiments mentioned earlier. However, the present invention is not to be thus limited, and the processes can also be realized by executing a prior formulated computer program using a computer. An example of the computer, which executes a forwarding program that includes functions similar to the functions of the forwarding apparatus that is indicated in the embodiments, is explained with reference to FIG. 11. FIG. 11 is a block diagram of the computer that executes the forwarding program.

As shown in FIG. 11, a computer 110 in the form of a transmitter includes a keyboard 120, a hard disk drive (HDD) 130, a CPU 140, a read only memory (ROM) 150, a random access memory (RAM) 160, and a display 170 that are connected by a bus 180.

The ROM 150 prior stores therein the forwarding program that exhibits functions similar to the functions of the forwarding apparatus 10 according to the first embodiment. In other words, as shown in FIG. 11, the ROM 150 prior stores therein an input process program 150a, a transfer condition searching program 150b, and an output process program 150c. Similarly as the components of the forwarding apparatus 10 that are shown in FIG. 2, the input process program 150a, the transfer condition searching program 150b, and the output process program 150c can also be integrated or broken down.

The input process program 150a, the transfer condition searching program 150b, and the output process program 150c are read by the CPU 140 from the ROM 150 and executed. Due to this, as shown in FIG. 11, the input process program 150a, the transfer condition searching program 150b, and the output process program 150c function as an input process 140a, a transfer condition searching process 140b, and an output process 140c respectively. The input process 140a, the transfer condition searching process 140b, and the output process 140c correspond respectively to the input processor 21, the transfer-condition searching unit 22, and the output processor 23 that are shown in FIG. 2.

Based on input data 160a, deleted area data 160b, and transfer condition data 160c that are recorded in the RAM 160, the CPU 140 executes a drawing creation program.

The input process program 150a, the transfer condition searching program 150b, and the output process program 150c mentioned earlier need not always be stored in the ROM 150 from the beginning. For example, the input process program 150a, the transfer condition searching program 150b, and the output process program 150c can be stored in a "portable physical medium" such as a flexible disk (FD), a compact disk-read only memory (CD-ROM), a digital versatile disk (DVD), a magneto optical (MO) disk, an integrated circuit (IC) card etc. that can be inserted into the computer 110, a "fixed physical medium" such as an HDD that can be arranged inside or outside the computer 110, "another computer (or server)" that is connected to the computer 110 via a public line, Internet, a local area network (LAN), a wide area network (WAN) etc. The input process program 150a, the transfer condition searching program 150b, and the output process program 150c can be read by the computer 110 from the media mentioned earlier and executed.

According to an embodiment of the present invention, input data can be smoothly forwarded to another forwarding apparatus without carrying out an updation of an FDB.

According to an embodiment of the present invention, an area, which is treated as a search target, can be easily specified in a bitmap format.

According to an embodiment of the present invention, the area, which is treated as the search target, can be flexibly specified for each layer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for forwarding a frame according to a transfer condition, comprising:
   a transfer-condition storage unit that stores therein a data including a destination data that is likely to be included in the frame, an area data that indicates an area a plurality of destination data are affiliated to and has a hierarchical structure composed of a plurality of layers, and the transfer condition corresponding to the destination data;
   a deleted-area data storage unit that stores therein a deleted area data as the area data, for a layer, when the area becomes non-existent, wherein the data including the deleted area data is to be deleted from the transfer-condition storage unit; and
   a transfer-condition searching unit that searches, in a plurality of the data excluding the data that includes the deleted area data for the layer, for the transfer condition corresponding to the destination data that is included in the frame without deleting the data including the deleted area data from the transfer-condition storage unit.

2. The apparatus according to claim 1, wherein
   the transfer-condition storage unit and the deleted-area data storage unit store therein as the area data, data in a bitmap format that is uniquely identifiable among pieces of area data, and
   the transfer-condition searching unit uses the area data in the bitmap format such that the area to which the deleted area data is assigned is removed from the search target and other areas are included in the search target, to search for the transfer condition from the transfer-condition storage unit.

3. A method of forwarding a frame according to a transfer condition, comprising:
   storing in a transfer-condition storage unit a data including a destination data that is likely to be included in the frame, an area data that indicates an area a plurality of destination data are affiliated with and has a hierarchical structure composed of a plurality of layers, and the transfer condition corresponding to the destination data;
   storing in a deleted-area data storage unit a deleted area data as the area data, for a layer, when the area becomes non-existent, wherein the data including the deleted area data is to be deleted from the transfer-condition storage unit; and
   searching, in a plurality of the data excluding the data that includes the deleted area data for the layer, for the transfer condition corresponding to the destination data that is included in the frame without deleting the data including the deleted area data from the transfer-condition storage unit.

4. A non-transitory computer-readable recording medium that stores therein a forwarding program for forwarding a frame according to a transfer condition, the forwarding program causing a computer to execute:

storing in a transfer-condition storage unit a data including a destination data that is likely to be included in the frame, an area data that indicates an area a plurality of destination data are affiliated to and has a hierarchical structure composed of a plurality of layers, and the transfer condition corresponding to the destination data;

storing in a deleted-area data storage unit a deleted area data as the area data, for a layer, when the area becomes non-existent, wherein the data including the deleted area data is to be deleted from the transfer-condition storage unit; and searching, in a plurality of the data excluding the data that includes the deleted area data for the layer, for the transfer condition corresponding to the destination data that is included in the frame without deleting the data including the deleted area data from the transfer-condition storage unit.

* * * * *